United States Patent [19]

Blum

[11] Patent Number: 5,178,800
[45] Date of Patent: Jan. 12, 1993

[54] METHOD FOR FORMING PLASTIC OPTICAL QUALITY SPECTACLE LENSES

[75] Inventor: Ronald D. Blum, Roanoke, Va.
[73] Assignee: Innotech, Inc., Roanoke, Va.
[21] Appl. No.: 594,136
[22] Filed: Oct. 10, 1990
[51] Int. Cl.$^5$ .............................................. B29D 11/00
[52] U.S. Cl. ..................... 264/1.4; 264/1.7; 264/2.3; 264/2.6
[58] Field of Search ................... 264/1.7, 1.8, 1.4, 2.2, 264/2.5, 2.6, 2.3; 425/808

[56] References Cited

U.S. PATENT DOCUMENTS

| | | | |
|---|---|---|---|
| 2,339,433 | 1/1944 | Staehle | 264/1.7 |
| 4,190,621 | 2/1980 | Greshes | 264/1 |
| 4,474,355 | 10/1984 | Greshes | 249/53 |
| 4,497,754 | 2/1985 | Padoan | 264/1.4 |
| 4,615,847 | 10/1986 | Howden | 264/1.7 |
| 4,623,496 | 11/1986 | Verhoeven et al. | 264/1.7 |
| 4,693,446 | 9/1987 | Orlosky | 425/808 |
| 4,774,035 | 9/1988 | Carmelite et al. | 264/1.4 |
| 4,873,029 | 10/1989 | Blum | 264/1.3 |
| 4,957,663 | 9/1990 | Zwiers et al. | 264/1.7 |

FOREIGN PATENT DOCUMENTS

80556/87 10/1987 Australia .
0226123 6/1987 European Pat. Off. .
0314417 5/1989 European Pat. Off. .

OTHER PUBLICATIONS

Patent Abstracts of Japan, M266, (8002), 7 Jan. 1984, & JP, A, 58167125 (Nippon Yushi K.K.) 3 Oct. 1983.
Patent Abstracts of Japan, M540, (19357), 2 Dec. 1986, & JP, A, 61154987 (Nagase Screen Insatsu Kenkyusho K.K.) 14 Jul. 1984.
Patent Abstracts of Japan, P550, (11058), 23 Feb. 1987, & JP, A, 61223820 (Gonjo Hidenori), 4 Apr. 1986.
Patent Abstracts of Japan, P885, (13261), 16 Jun. 1989, & JP, A, 105517 (Hitachi Chem. Corp. Ltd.) 2 Mar. 1989.

Primary Examiner—James Lowe
Attorney, Agent, or Firm—Kenyon & Kenyon

[57] ABSTRACT

A fast, relatively inexpensive method and simple is disclosed for producing a finished plastic multifocal or progressive lens from a preformed lens which has a predetermined lens correction (i.e., curvature or prescription) at its optical center. The disclosed method produces a finished lens which has a multifocal or progressive region without changing the lens correction at the optical center of the lens.

16 Claims, 3 Drawing Sheets

METHOD FOR FORMING PLASTIC OPTICAL QUALITY SPECTACLE LENSES

This application is a continuation in part of application Ser. No. 07/446,151, filed Dec. 5, 1989 which was a continuation in part of application Ser. No. 07/422,399, filed Oct. 12, 1989, now abandoned, application Ser. No. 07/339,217, filed Apr. 17, 1989, now U.S. Pat. No. 5,028,538, and application Ser. No. 07/190,856 filed May 6, 1988, now U.S. Pat. No. 4,919,850, and of application Ser. No. 07/114,962, filed Oct. 30, 1987, now U.S. Pat. No. 4,873,029.

FIELD OF THE INVENTION

The present invention relates to methods for quickly and inexpensively producing multifocal and progressive plastic optical quality spectacle lenses from preformed lenses of a given prescription.

BACKGROUND OF THE INVENTION

In manufacturing lenses, and particularly lenses for eyeglasses, the use of plastics is often desirable due to their light weight and durability. Plastic lenses also provide relatively economic vision correction. Methods for producing plastic lenses of various prescriptions are well known. Applicant's U.S. Pat. No. 4,873,029, 4,919,850 and 5,028,538, which are incorporated herein by reference as if fully set forth, disclose methods for making plastic lenses of ophthalmic quality for eye glasses.

Prior methods of others have, however, failed to provide fast and economic means for manufacturing high index-quality, reliable multifocal (e.g., bifocal, trifocal, etc.) or progressive plastic lenses. U.S. Pat. No. 3,248,460 (the "'460 patent") discloses means for casting plastic lenses from thermosetting or thermoplastic materials wherein a plastic blank having significantly less curvature than required for the full intended prescription of the lens is used as a base onto which an additional layer of material is cast. The '460 patent employs a conventional optical gasket to provide space between the plastic blank and the mold and to hold the resin material in the cavity created thereby. The additional layer of material changes the curvature of the resulting lens over the vast majority of its surface, thereby changing the prescription of the resulting finished lens to the power required. The material in the '460 patent is cured by heat. However, such heat curing process requires heating over a period of more than 12 hours, thus making the formation of the lens a long, drawn-out process.

U.S. Pat. No. 3,946,982 also discloses methods for casting an entire lens surface with a prescription layer using a conventional optical gasket.

Conventional industrial lens casting techniques require the use of "conventional optical gaskets" which hold together the components used to cast the lens, allow for thickness to be cast into the resultant lens, and create a substantially air-tight environment for the casting process. In most cases these conventional optical gaskets can only be used one time and then are discarded. Therefore, a significant number of different gaskets must be maintained.

In-office lens casting is even more demanding with regard to the number of different conventional optical gaskets needed and the inventory necessary to produce different finished lens prescriptions. In one such system, approximately 737 conventional optical gaskets must be maintained in inventory and constantly replaced (after one use) to allow production of all prescriptions. Approximately 200 "optical center movers" (OCMs) must also be inventoried to relocate or decenter the optical center. These OCMs are also not reusable and must be constantly replaced. The need to maintain and replace this varied inventory of conventional optical gaskets and OCMs contributes significantly to the cost of lens casting. In the case of in-office lens casting these components can account for approximately 32% of the materials cost of casting a lens using such a system.

Others have tried to manufacture multifocal or progressive plastic lens, using a lamination technique. Such a technique joins a preformed plastic section to another cured plastic prescription lens. A portion of the preformed section defining a multifocal or progressive region of the finished lens is joined to the prescription lens by adhesive. Such methods have proved to be technologically cumbersome and uneconomical, however, due to the expense of maintaining a large number of preformed lens portions such that all of the possible permutations of patient primary correction and multifocal correction can be formed. Furthermore, the optical quality of such lenses has been suspect because of the difficulty of matching the surfaces of the preformed lens and the wafer.

In the case of in-office lens casting which casts the finished prescription, and to a lesser extent industrial lens casting which casts primarily semi-finished lens blanks, a prism effect may also need be accommodated in the molding process. Present methods for creating prism in plastic lenses have also proven cumbersome. "Prism" is created in lens designs to shift the optical center of a lens from the geometric center of the lens to some other preferred location. Also in the case of progressive lenses, it is used for a compensating base-down prism to offset the base-up prism produced by the progressive mold. In multifocal lenses it is advantageous to shift the optical center of the distance portion of lens to more closely align with the multifocal region of the lens, thus easing the wearer's transition from the distance prescription to the prescription of the multifocal region (near region) of the lens.

When casting a finished lens, prism is cast into the lens in ways that are well known in the art. However, in cases of semi-finished lenses, in order to create prism the lenses must be surfaced to produce both the desired prismatic effect and the correct optical prescription. Surfacing requires additional equipment and time which make such methods less than desirable for making lenses quickly and inexpensively from start to finish.

When reviewed from an overall perspective of lens production, starting with liquid resin and ending with a finished lens mounted in the frame, the conventional process is extremely complex, long and arduous. Curing has required 12-14 hours; wholesale lab surfacing of the cured lens semi finished blank, approximately an additional 30 minutes; and finishing the lens, another approximately 30 minutes. Thus, the overall lens manufacturing process can require 13-15 hours, making it difficult to quickly provide prescription lenses on request, unless one stocks semi-finished blanks and utilizes surfacing equipment, both of which add tremendously to the overall cost of production which is ultimately passed on to the consumer.

It would, therefore, be desirable to provide a faster, more economical method and much simpler for producing multifocal or progressive lenses. It would also be desirable to provide a method for changing the prescription or lens design (i.e., multifocal, progressive, prismatic effects, etc.) of a preformed prescription plastic lens which is both fast and inexpensive. Preferably, such method should produce lenses without employing a conventional optical gasket.

SUMMARY OF THE INVENTION

The present invention relates to a fast, simpler and relatively inexpensive method for providing a multifocal or progressive region on a preformed plastic optical quality spectacle lens to produce a resulting finished multifocal or progressive lens. The preformed lens has a predetermined lens correction (i.e., curvature or prescription) at its optical center which is unchanged in the finished lens. The preformed lens can be a finished lens (having a curvature or correction on front and back surfaces) or a semi-finished blank lens (having a curvature or correction on only one surface).

The preformed lens can also be "pre-edged" into the desired shape of the lens such that the resulting lens is ready for mounting after the casting process without need for additional edging. In certain preferred embodiments, the pre-edged preformed lens can be used with a pre-edged mold such that the resultant lens is formed to the desired shape without the need for additional edging. When a disposable mold is employed, the preformed lens and disposable mold can be edged together after the optical center, multifocal segment or progressive region, and astigmatic axis are properly aligned and used to cast a final lens of the desired shape without significant flashing. In some of such embodiments, a special gasket could be employed which employs a bevel which provides a groove or bevel around the edge of the resultant lens for directly mounting the lens in glasses frames. Alternatively, the pre-edged preformed lens could be used with a mold which is significantly larger than the preformed lens, such that the resultant lens is made with very little flashing.

By casting an optical segment or other multifocal or progressive region on the surface of the preformed lens myriad lens designs can be achieved quickly and inexpensively. Such method decreases the large number of different mold combinations usually needed to cast multifocal and progressive lenses. Also, in certain embodiments, it eliminates the large, expensive and cumbersome number of conventional optical gaskets and OCMs customarily used in in-office lens casting. In most instances, the lenses produced according to the invention also do not require additional surfacing to achieve the proper prescription and can eliminate the additional step of surfacing prism into the finished lens to relocate the optical center. The methods of the present invention allow production of bifocal, multifocal, progressive and aspheric lenses, among others, from previously formed prescription lenses. In essence, the preformed lens serves as a mold which is consumed during the casting process and forms a part of the finished lens.

The multifocal or progressive region can be cast onto the preformed lens alone or in combination with an additional thin non-prescription layer of resin which acts as a carrier for the resin defining the multifocal or progressive region. It should also be noted that the preformed lens and mold used in practicing the various embodiments of the present invention need not have the same base curve.

The methods of the present invention can also be used to convert preformed single vision, multifocal or progressive lenses into aspheric lenses by adding material to the lens surface. In such embodiments, the cavity formed by the preformed lens and the molds corresponds to the desired shape of the surface needed to create the aspheric effect.

In contrast with traditional lens casting methods, the methods of the present invention provide lenses relatively quickly and at significantly less cost. Using the methods disclosed herein that use ultraviolet light curing, curing requires approximately 5-30 minutes, no surfacing is required, and finishing requires another approximately 30 minutes. Thus, the present invention provides means for producing optical quality multifocal and progressive lenses in approximately 1 hour or less, starting with liquid resin and ending with the finished lens in the frame. This allows delivery of prescription lenses upon request and without having the patient wait a significant time. Due to the ability to cast without a conventional optical gasket, in some cases, the methods of the present invention even allow the preformed lens to be finished (i.e., edged and tinted) for the exact customer frame before adding the thin non-prescription carrier layer and multifocal or progressive surface.

Various other advantages of the methods of the present invention and lenses made thereby will be evident from the detailed description of certain embodiments below.

BRIEF DESCRIPTION OF THE FIGURES

The relative thickness of various components is greatly exaggerated in the Figures for the purpose of illustration.

DETAILED DESCRIPTION OF THE INVENTION

The method for making a finished lens having a multifocal or progressive region utilizes a mold; an optical quality resin composition; a preformed plastic lens having a predetermined lens correction at its optical center. The preformed lens is contacted with the mold to form a cavity for enclosing the resin composition. The resin is then cured and shaped by the cavity which corresponds to the shape of the multifocal or progressive region. The lens correction at the optical center of said resulting lens is substantially the same as the predetermined lens correction at the optical center of the preformed lens.

The methods disclosed herein may cast a thin, nonprescription layer of material over some or all of the preformed lens surface in addition to casting the multifocal or progressive region alone. Such additional layer acts as a "carrier" for the multifocal or progressive surface without affecting the predetermined distance prescription of the preformed lens. In such cases, the cavity may also correspond to the shape of such carrier.

Figure 1:
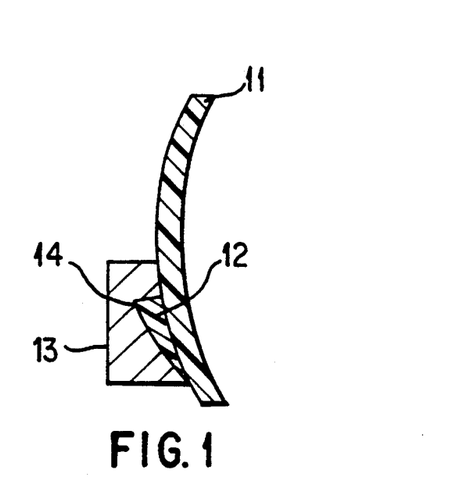
FIGS. 1-5 are cross-sections of assemblies of a mold and a preformed lens in accordance with the present invention.
Figure 2:
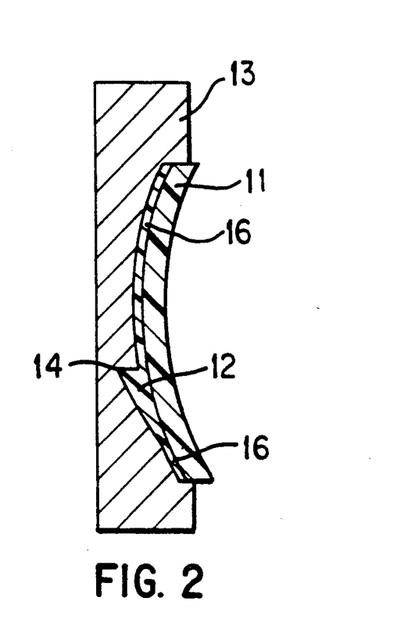
Figure 3:
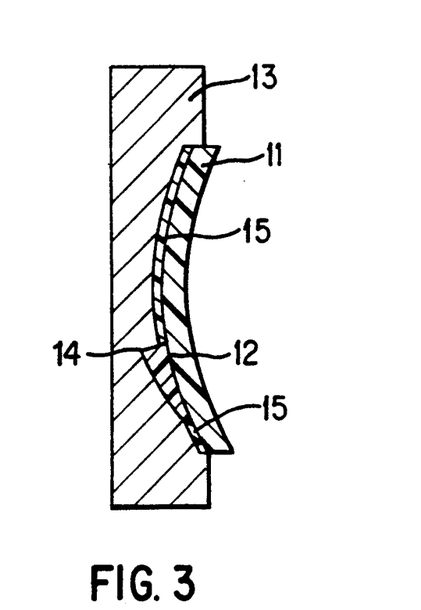

FIGS. 1-3 depict the formation of lenses in accordance with the methods disclosed herein. Mold 13 and preformed lens 11 form a cavity 14 which contains a portion of the optical resin composition. In FIGS. 1 and 3, cavity 14 defines a multifocal (bifocal) segment 12. In FIG. 2, cavity 14 defines a segment 12 and a carrier layer 16 (which does not change the distance prescription of the preformed lens). When cured, the segment and/or carrier harden and bond to the preformed lens to produce the finished lens.

The mold and the preformed lens may be contacted (a) after the resin composition is placed onto the preformed lens, (b) after the resin composition is placed onto the mold, or (c) before the resin composition is applied to either component (i.e., the resin composition is dispensed into the cavity formed by the mold and the preformed lens).

The cavity formed by the preformed lens and the mold is shaped or configured, among other purposes, (1) to correspond to the desired shape of the multifocal or progressive region of the finished lens, and (2) to maintain the lens correction at the optical center of the resulting lens substantially the same (preferably the same) as the predetermined lens correction at the optical center of the preformed lens, even when the surface of the preformed lens is cast within a carrier layer. This is even true, as described herein, when the optical center of the resulting lens has been shifted to achieve the proper alignment with respect to multifocal and progressive prescriptions. In certain embodiments, at least one surface of the preformed lens or mold is masked prior to contacting the lens with the mold. The cavity can also be shaped to correspond to the shape of a resultant prism region which creates prism in the resulting lens.

The finished optical lenses made in accordance with such methods provide a first lens correction at their optical centers and have a second region removed from the optical center (i.e., the multifocal or progressive region) which provides a second lens correction.

A method is also provided for forming such a multifocal lens in multiple stages. A preformed lens is first cast as described above to provide an intermediate lens having an intermediate lens correction at the second region, the magnitude of which is between the magnitudes of the first lens correction and the second lens correction. The intermediate lens is then cast again as described to provide a lens curvature at the second region corresponding to the second lens correction (and a carrier, if used).

Lenses made in accordance with the present invention are also disclosed in which addition of a multifocal optical segment creates a beneficial positive transition in the finished lens. Such lenses provide at least a third lens correction and a fourth lens correction. The third lens correction is provided by a third region adjacent to the optical segment and is located between the optical center of the preformed lens and the center of the segment. The fourth lens correction is provided by a fourth region within the segment and is located between the optical center of the preformed lens and the center of the segment. As described further below, the magnitude of the third lens correction is between the magnitudes of the first lens correction and the fourth lens correction; and the magnitude of the fourth lens correction is between the magnitudes of the second lens correction and the third lens correction, such that a gradual discontinuous change in prescription is provided. This phenomenon has been observed mainly in connection with addition of a flat top optical segment.

The methods of the present invention can be used to add a multifocal or progressive region to the front lens surface, the back lens surface or both. Preferably, the curvature of the lens is changed over only a small portion of a surface of the preformed lens to form an "optical segment". The methods of the present invention can be used to form lenses of almost any multifocal or progressive optical configuration including without limitation bifocals, trifocals and progressive lenses. Where a multifocal or progressive lens is produced, the preformed lens can be treated in accordance with the invention to provide an optical segment providing a second lens correction (e.g., bifocal), a third lens correction (e.g., trifocal), etc., each of which is different from the distance lens correction of the preformed lens (i.e., at its optical center). In such embodiments the mold is fashioned to correspond to the desired shape of the multifocal or progressive region of the resulting lens and any carrier layer, if used. The disclosed methods can also be used to change the power on portions of the preformed lens, to create prism, and to produce multifocal or progressive lenses from preformed lenses. During the casting and curing process, the mold and preformed lens may be held together by, among other means, peripheral clamping around the extreme periphery of the preformed lens and the mold, a conventional optical gasket which holds the preformed lens and mold together, by the force provided by the weight of the preformed lens when it is placed on top of the mold, capillary attraction resulting from a very thin film of resin material between the mold and preformed lens (resulting from the compressive force the mold or preformed lens on the resin material), or a combination thereof. However, preferred embodiments of the present invention do not require use of a conventional optical gasket, thus allowing more versatile and flexible casting and making such methods significantly more economical than traditional casting methods which employ conventional optical gaskets. The ability to cast lenses without conventional optical gaskets further eliminates a restrictive element which limits the possibilities of lens construction due to the physical confines of the conventional optical gasket.

In some of such embodiments, molding material is dispensed without the use of conventional optical gaskets into the mold and the preformed lens is placed on top of the resin and slight pressure is applied which presses molding material out of the mold until the surface of the lens is separated from the mold by a thin carrier layer of molding material. The mold and preformed lens are held together by capillary attraction of the resin layer, by weight and/or other means. Thus a thin carrier layer of material is cast over the surface of the preformed lens, in addition to a segment or other optic surface defined by the mold, without the use of a conventional optical gasket. If less resin material is used, such method can also be employed to cast a multifocal or progressive region without also casting a carrier. Alternatively, the mold can be lowered onto the preformed lens containing molding material to achieve a similar effect.

The methods of the present invention differ from prior processes by the fact that compressive forces are employed to cast the thin layer of resin material. Furthermore, in the process of the present invention, the resin material contracts or shrinks as it cures such that the upper of the mold and the preformed lens is pulled down toward the lower.

The methods of the present invention are useful with respect to any preformed "plastic" optical lens regardless of the manner in which such lens was formed. As used herein a "plastic" lens is one fashioned from optical quality resin materials. Such materials include without limitation mixtures containing allyl diglycol carbonates (such as "MasterCast 1" and "MasterCast 2" which are trademarks of Vision Sciences, Monrovia, Calif.; and "CR-39" which is a trademark of PPG Industries), allylic esters such as triallyl cyanurate, triallyl phosphate, triallyl citrate, diallyphenyl phosphonate, acrylic esters, acrylates, methyl, allyl and butyl methacrylates, polycarbonates, styrenics, lexan, polyesters including those formed of ethylene glycol maleate and other liquid monomer/polymer materials having high indices of refraction (such as HiRi which is a trademark of PPG Industries). Resin materials which are photosensitive (i.e., photochromatic) or pretinted can also be used in practicing the present invention.

Any surface of a preformed lens (i.e., front, back or both) can be altered using the methods of the present invention. Convex or concave surfaces can be treated. Only portions of a surface can also be treated.

For example, as shown in FIG. 1, the curvature of a lens surface 11 can be changed over a small area by providing an "optical segment" 12 which is substantially smaller than the preformed lens 11. Such optical segments most often serve to provide bifocal or trifocal vision, but can also be used for other purposes.

In other embodiments, an entire surface of a lens can be altered in accordance with the methods of the present invention for the purpose of, for example, converting the preformed lens into a progressive lens, providing, for example, a seamless multifocal, bifocal or trifocal lens or inducing prismatic effects in the finished lens. In such embodiments, in addition to a segment if desired, as shown in FIG. 2, the surface of the preformed lens is recast with an additional non-prescription carrier layer of resin material to produce the desired lens design without changing the prescription or correction at the optical center of the finished lens. Preferably, the additional carrier layer is very thin (preferably 0.025-0.5 mm) to promote rapid curing and decrease the probability of developing stress and distortion in the resulting finished lens.

Although optical segments can be placed in any location on the lens, for normal applications, the optical segment should be properly located to avoid adverse prismatic effects. Optimally, an optical segment should be positioned approximately 1.5 mm left or right and 3-5 mm down from the optical center of the lens for normal eyeglasses. In certain applications, such as workman's glasses for close vision above the wearer's head, the optical segment can be optimally located approximately 1.5 mm left or right and 3-5 mm above the optical center of the lens. Other locations of the optical segment can also be used as long as the optical center and the segment are properly aligned.

The methods of the present invention can also be for properly orienting the optical center of the lens with respect to the multifocal or progressive region. Also they can be used to cast compensating base-down prism in conjunction with casting a progressive lens. Appropriate lens designs providing prismatic effects will be apparent to those skilled in the art. Where creating prism is desired, the casting mold is configured and positioned with respect to the preformed lens to provide the required additional thickness in the resulting lens. The mold and the preformed lens may be properly oriented by spacers which provide the desired separation, corresponding to the required thickness for inducing the prismatic effects sought. Such spacers can take any form, including wedges, and can be fashioned from any suitable material. The spacers can be incorporated into a conventional optical gasket, if one is used, or formed on the surface of the mold or preform. Other means for orienting the mold and preformed lens to induce prismatic effects will be apparent to skilled artisans.

Figure 7:
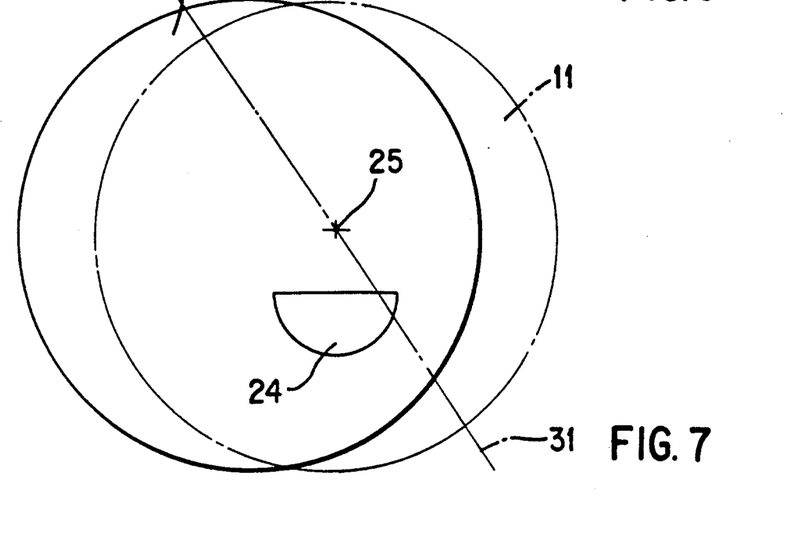
FIG. 7 is a front view of a mold and preformed lens (in dashed lines) showing physical displacement of the optical center (indicated by "+") of the preformed lens with respect to the mold portion corresponding to an optical segment and also showing the astigmatic axis (indicated by dashed line 31) fixed for a specific prescription.

The optical center can be moved or displaced, as shown in FIG. 7, by physically moving the optical center 25 of preformed lens 11 to align with the desired location just above the edge of the multifocal region in the case of a multifocal lens or to the proper mold position in the case of a progressive lens, then casting the new lens surface. Since some methods of the present invention do not employ a conventional optical gasket, such dislocation of the preformed lens with respect to the mold is possible. Conventional methods employing a conventional optical gasket make such dislocation virtually impossible because the conventional optical gasket will not allow movement of the lens with respect to the mold. It should also be noted that, when dislocating the preformed lens in relation to the mold size as just described, more useful lens area can be produced by increasing the size of the preformed lens such that more of the surface of the mold contacts the preformed lens, thus producing a larger finished lens surface. However, either the preformed lens or the mold can be the larger in size to achieve the desired displacement or decentration, or the preformed lens and the mold can be the same size and simply moved relative to each other.

In some lens designs adjustments must be made to accommodate astigmatism in the prescription of the finished resulting lens. In such cases, the preformed lens and mold must be rotated with respect to each other to a degree corresponding to the proper astigmatic axis. The preformed lens and mold can either be contacted at the proper angle or can be rotated with respect to each other after contact. The mold, preformed lens or conventional optical gasket (if used) can optionally be provided with appropriate markings (e.g., protractor lines) for determining the proper astigmatic axis. Alternatively, the mold and preformed lens can be assembled within or on a circular protractor which serves to align the astigmatic axis and to hold the assembly in place.

In multifocal lenses it is important to properly orient the optical center, the multifocal region and the astigmatic axis of the finished lens with respect to each other. This can be achieved, for example as shown in FIG. 7, by combining the methods described above for inducing prismatic effects and for aligning the astigmatic axis.

Figure 9:
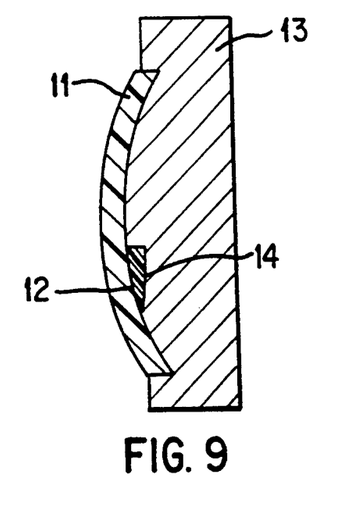
FIG. 9 is a cross-section of an assembly for casting the convex side of a lens in accordance with the present invention.

Generally, the preformed lens is transformed by casting a layer of optical quality resin material on at least a portion of the preformed lens surface. As shown in the Figures, the contours of the casting are determined by mold 13. Mold 13 is shaped such that the cavity 14 formed between lens 11 and mold 13 corresponds to the desired change in curvature of the lens, including the multifocal or progressive region (e.g., optical segment 12) and non-prescription carrier layer 16, if used. For example as shown in FIG. 1, mold 13 is fashioned such that cavity 14 defines an optical segment 12 at the desired location and of the desired thickness and shape to provide a desired lens design. In FIG. 2, cavity 14 defines an optical segment 12 and non-prescription carrier 16. Similarly, as shown in FIG. 9, mold 13 can be fashioned such that the cavity 14 defines new structure on the back surface of the preformed lens 11 such that the surface is changed to provide the desired lens design.

Molds can be made from any material which will provide an optical quality surface when used for casting, such as Crown glass or electroformed nickel. Means for making appropriate molds and for fashioning such molds for use in accordance with the present invention are known in the art.

To cast the new lens surface, an optical resin monomer material is dispensed onto the preformed lens, onto the mold or into the cavity, and then cured. In certain embodiments only a portion of cavity may be filled with material to form the desired new surface. Appropriate optical resin materials include those previously discussed among others. Certain materials used to "hardcoat" lenses (such as those described in U.S. Pat. Nos. 4,758,448 and 4,544,572, which are incorporated herein by reference) can also be used as the resin material, thus providing a durable surface to the portions of the finished lens cast in accordance with the present invention. Hard coat materials can also be blended with other resins for use in practicing the present invention. Furthermore, the resultant lens can be a composite of high index plastic materials and more scratch resistant materials. The resin material should, however, be chosen such that upon curing the material will both harden and bond with the material of the preformed surface of the lens. Preferably the resin material will form what is thought to be intermolecular bonds with the material of the preformed lens.

In preferred embodiments, both the preformed lens and the resin material used to recast the lens surface are the same or similar material. Use of the same or similar materials prevents separation or "crazing" (i.e., cracking) of the new surface from the preformed lens as a result of different expansion/contraction rates for the preformed lens and recasting materials. Applicant also believes that use of the same or similar materials may allow formation of intermolecular bonds between the new resin and the surface of the preformed lens.

The resin material composition may also contain various additives which will alter the resulting lens including without limitation tints, antireflection coatings, antiscratch coatings, and ultraviolet inhibitors. The resulting lens may also be subjected to treatments frequently applied to plastic lenses, including without limitation tinting and coating with ultraviolet inhibitors and antireflection and antiscratch coatings, according to known methods.

Coatings can also be provided to the resultant lens by transferring coatings from the mold to the resultant lens. In such embodiments, the mold is first coated with the material to be transferee to the lens, such as antiscratch, antireflective, photosensitive or hard coatings. The coated mold is then employed as described herein. If the coating material has a greater affinity for the lens resin material than for the mold surface, the coating will be transferee to the surface of the resultant lens. Suitable materials and means for applying them are known in the art, including without limitation those disclosed in U.S. Pat. Nos. 4,758,448 and 4,544,572.

Ultraviolet curing allows use of tinting agents in the resin composition which would be decomposed or volatilized during thermal curing processes. If UV curing is used, in most cases, tinting agents can be added to the resin composition before curing and incorporated relatively uniformly into the resulting finished lens. Since in some cases significant heat does not need to be employed in the UV curing process the tinting agent is retained by the resin material during the curing process. This is accomplished because no peroxide-based thermal initiator is used therein.

In certain embodiments, as shown in FIG. 3 for example, the preformed lens is masked with tape 15 or other appropriate materials. The masking can be used on the side of lens which is to be cast in accordance with the present invention, thus preventing casting undesired portions of the lens surface. Alternatively, the mask can be applied to the opposite surface of the lens to limit the area through which UV radiation can reach the resin material, thus limiting the area in which the resin is cured. Masks can also be used on the mold, the preformed lens, or both, and on both sides of each and any component.

However, tinting lenses having an optical segment cured using UV can present certain problems. When such lenses are soaked in the tinting bath, the optical segment may get darker than desired due to the softer consistency of the segment caused by uneven curing as a result of its variable thickness. These problems can be avoided in several ways. First, the preformed lens could be pre-tinted and then cast in accordance with the present invention. Since tint need not be applied to the optical segment in such embodiments the tinting problem is avoided while the tint effect is still observed over the entire surface of the lens. Second, the resultant lens could be masked on its front surface (including the optical segment) before tinting. Thus, the tint is only absorbed into the back surface of the lens and not into the optical segment. Preferably the tinting mask is transparent to allow monitoring of the tinting process.

Figure 10:
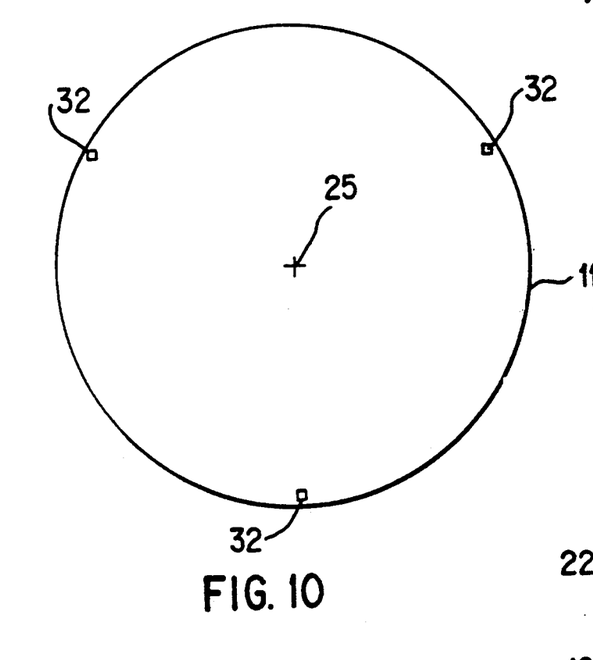
FIG. 10 is a front view of a preformed lens for use in accordance with the present invention fitted with spacers to increase casting thickness which ultimately become part of the completed lens.

The preformed lens and mold may be separated by spacers which maintain a desired separation between the lens and the mold, thus providing a recast surface of a desired thickness. Spacers can be incorporated as part of a conventional optical gasket used to hold the lens and mold together or can be used independent of a conventional optical gasket. Any suitable material, for example, small pieces of tape can be located between the lens and mold at various points around the periphery of the lens/mold assembly as shown in FIG. 10. Using carpet tape provides a surface approximately 0.4 mm thick, while use of (commercially-available transparent adhesive tape (e.g., "SCOTCH" brand tape) provides a surface 0.2–0.3 mm thick. Spacers can also be constructed from material that is the same as or similar to the preformed lens and/or the resin composition.

Upon curing, such a spacer could become incorporated into the finished resulting lens. Finally, spacers can be a part of the mold or preformed lens (e.g., raised bumps on the surface which provide the desired separation). In certain embodiments, spacers are not used and the preformed lens and mold are either not separated or are separated by a thin carrier layer of resin composition formed by capillary action when the preformed lens and mold are contacted. Such layers cast in accordance with the present invention have been measured as thin as 0.025–0.05 mm thick. In most cases, such methods do not employ a conventional optical gasket.

In certain embodiments, the resin is not dispensed into the cavity until after the mold and preformed lens are assembled. In such embodiments the resin material is injected into the resulting cavity through a channel in the mold, conventional optical gasket or preformed lens, taking care to prevent formation of air pockets within the cavity. Any burrs or other artifacts resulting from the presence of such a channel or other structure can then be removed during finishing of the resulting lens.

Once the mold and the preformed lens are assembled the resin material in the resulting cavity must be cured to harden and bond with the preformed lens surface. The resin material may be cured in any manner appropriate to the composition of such material. Most materials can be cured by exposure to heat or ultraviolet radiation ("UV"). Other curing methods may include without limitation ultrasound, infrared, microwave and other forms of radiation. Thermal initiators (such as diisopropyl peroxydicarbonate) and/or UV initiators (such as 2-hydroxy-2-methyl-1-phenyl-propan-1-one or 1-hydroxycyclohexylphenyl ketone) are mixed with the optical resin material before it is used.

Suitable UV light sources include those manufactured by Phillips Corporation and identified as TL/10R/UVA reflector lamps, HPM high pressure halide lamps, HPA medium pressure metal halide lamps and HPR high pressure mercury vapor lamps. In preferred embodiments, the UV source (300–450 nm) is applied during the curing process until the resin hardens sufficiently (approximately 5–30 minutes). In some cases, the lenses to be cured are placed onto a turntable for rotating the lenses through the stream of incident radiation in order to achieve more even curing and maximizing the number of lenses which can be cast within a given area. Other appropriate UV light sources and conditions for exposure will depend upon the resin composition employed and will be apparent to those skilled in the art.

Curing can also be performed using a "blinking" UV light source. Curing with a blinking source tends to produce an optical segment with less variation in consistency.

Heat or UV, or both, may be applied by any means appropriate to the material from which the mold and preformed lens are made. Unlike thermal curing, UV curing requires at least one UV transparent surface through which the UV radiation can travel to reach the resin monomer material. Although the preformed lens provides one transparent surface, forming the mold from a UV-transmitting material will provide additional transparent surfaces and will promote faster, more even curing. Upon application of heat, UV or both, the initiators cause the optical resin material to polymerize and to bond to the surface of the preformed lens.

Certain embodiments of the present invention use a reflective surface on the surface of the mold to reflect ultraviolet light back through the lens resin material being cured. The mold includes a reflective surface conformed to the casting surface of the mold. The exposed surface of the reflective surface is highly polished to reflect ultraviolet light rays from ultraviolet light source. This surface of the reflective surface may act directly as a casting surface that produces an optical quality lens surface or may be fixed beneath a transparent layer which acts as the actual casting surface of the mold.

Some materials can be cured by a combination of heat and UV applied sequentially or simultaneously. For example, applicant's co-pending application Ser. No. 190,856, filed May 6, 1988, and now U.S. Pat. No. 4,919,850, which is incorporated herein by reference, discloses a resin material and means for curing such material using both heat and UV. Such material includes a liquid monomer, a thermal initiator, plus a photosensitive ultraviolet initiator. In this process, the liquid monomer lens resin material is placed into the desired preformed lens/mold combination and subjected to thermal curing using a heated fluid bath (preferably 150°–180° F.) for a short period of time, less than ten (10) minutes. The heat activates the thermal initiator and forms the lens material mixture into a gel which freezes the photosensitive initiator in place throughout the lens material. Furthermore, this gelled state preestablishes the optical framework needed for an optical lens relatively free of optical distortion or imperfections. After the lens material mixture has sufficiently gelled, it is then subjected to ultraviolet light to activate the photosensitive initiator and complete the polymerization or curing process to form the finished lens.

Preferred resin compositions for use with such a combined thermal/UV curing process comprises resin monomer (such as CR-39), 0.5–5.0% by weight thermal initiator (such as diisopropyl peroxydicarbonate), and 1–8% by volume photosensitive initiator (such as 2-hydroxy-2-methyl-phenyl-propan-1-one or 1-hydroxycyclohexylphenyl ketone, which are sensitive to ultraviolet light).

Particularly for lens manufacturing processes using UV curing, a yellow tint may remain in the resulting lens or may evolve during aging. This tinting or "yellowing" can be reduced by curing the lens material with the addition of certain anti-yellowing chemical agents. These include amine hindered amine light stabilizer (HALS); optical brighteners which makes the yellowing or hindered phenol antioxidants. Another method is to use a photosensitive initiator which is not from the amine group and which will not cause yellowing.

It has also been found that inadvertent post curing and additional yellowing or discoloration can occur after a lens has been cured by permitting the lens to be subjected to a UV curing process longer than desired or inadvertently exposing the lenses to sunlight or artificial light, which includes wavelengths of the UV spectrum, during processing or use. Additional exposure to UV light produces a continued curing effect because of the remaining UV initiator in the formed plastic lens. This can cause the lens to be unduly brittle and cosmetically discolored, permitting it to be readily fractured and detracting from the normal life or commercial sale of the lens.

The invention described herein can include the use of UV inhibitors coated on the surface of the cured lens or absorbed into the surface of the cured lens to avoid any additional effect on the UV initiators and to substantially prevent or entirely eliminate the transmission of UV light waves into the lens. Such processes are further described in co-pending U.S. patent application Ser. No. 339,217, filed Apr. 17, 1989, and now U.S. Pat. No. 5,028,538. This coating can take the form of anti-reflective coating, a scratch-resistant coating, any tinting coatings, or simple wavelength coating which could be basically clear for preventing UV wavelengths from being transmitted. Such UV inhibitors are well known in the art and need not be described in detail herein. It is desirable to have the UV inhibitor eliminate all UV light and other wavelengths having a wavelength of 500 nm or less and more specifically between 300-425 nm.

This treatment process normally involves, after the curing steps, simply dipping the cured lenses into a hot bath having any one of the coatings mentioned above to coat the surfaces sufficiently such that the entire surface of the lens is covered with the inhibitor. This dipping process, as well as other processes for applying the coatings noted above are well known to those skilled in the art. The UV inhibitor can be used in solution or otherwise form a composition with the coatings discussed above, such that the desired coating along with the inhibitor can be applied to the lens in a one step process. Some inhibitor may be absorbed into the lens material. Other known methods of coating can be used in applying the UV inhibitor in the manner described above.

Prior to lens surface treatment, if any additional hardening is required, the lens can be subjected to "post curing". Although a post cure can be utilized with any of the above noted processes, it is not normally used for bath cures since the mold and other intervening media may affect the ability to achieve maximum hardness. Preferably for post curing, after the thermal and/or UV cure, the lens is separated from the mold and subjected directly to UV or heat. This post cure using UV and or a thermal source will harden the lens material even further should such additional hardness be required. In some cases, post curing with UV is done with a filter mask that allows more UV radiation to strike the thicker surfaces of the lens.

Figures 5, 6:
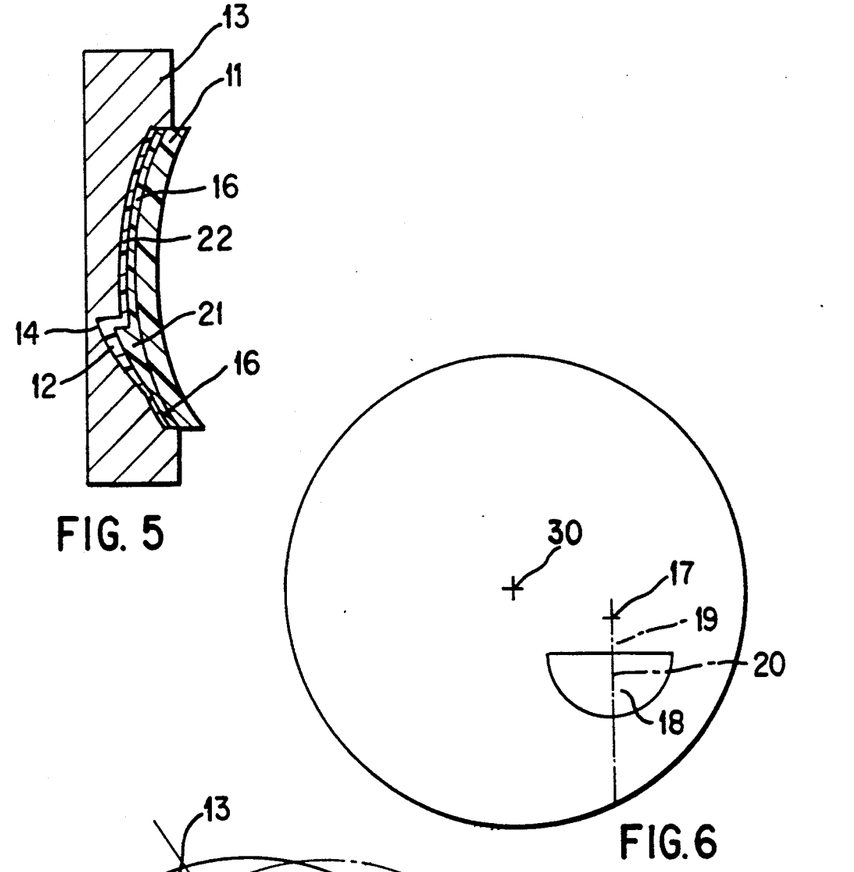
FIG. 6 is a front view of a bifocal lens made in accordance with the present invention.

Applying an optical segment in accordance with the present invention may in some instances produce a minor, but beneficial transition in the finished lens near the edge of the segment. This phenomenon has been observed mainly in connection with the formation of multifocal segments having a flat edge. For example, as shown in FIG. 6, when applying a conventional flat top 28 +250 bifocal segment to a plano preformed lens, the main prescription of the segment may be +250 while the upper edge of the segment may be only +212. The optical center of the preformed lens may remain plano, but the area of the lens just above the segment may be, for example, +87. This beneficial transition provides a possible effect in that when the wearer's eye moves from the main prescription to the bifocal prescription the eye is eased from lower to higher power, thus requiring a less drastic change in accommodation.

In effect, a bifocal lens having such a transition provides at least four different lens corrections or prescriptions at different regions of the lens. As shown in FIG. 6, the lens has a first correction in the region 17 of its optical center and a second lens correction in a second region 18 at the center of the bifocal segment. The geometric center of the lens is indicated at 30. A third lens correction is provided by a third region 19 located adjacent to the edge of the segment (i.e., adjacent to the second region) approximately along an imaginary line (indicated by a dotted line) extending from the geometric center of the segment to the optical center of the lens. A fourth lens correction is provided by a fourth region 20 located within the segment (i.e., within the second region) and approximately along the same imaginary line. The magnitude of the third lens correction is between the magnitudes of the first and fourth lens corrections and the magnitude of the fourth lens correction is between the magnitudes of the second and third lens corrections. For example, in the example previously discussed the first, second, third and fourth lens corrections are plano, +250, +87 and +212, respectively. In other multifocal lenses additional lens corrections may also be provided by the segment.

However, in many instances such transition is undesirable and can be prevented or alleviated in several ways. At present, applicants believes that the transition is caused by uneven curing of the segment and the thin carrier layer which are cast on the surface of the preformed lens. Due to the different thicknesses of portions of the newly applied surface, curing occurs at different rates and to different degrees during exposure to UV light or other curing methods. This results in areas of the lens which are harder than others and may result in uneven shrinkage and stress of different lens portions, thus producing the transition. Therefore, any means for promoting even curing of the newly cast surface will serve to prevent or alleviate the transition.

For example, the preformed lens could be provided with a mask which selectively transmits UV light at different levels. Thicker portions of the cast surface are covered with a mask transmitting more light, while thinner portions of the cast surface are covered with a mask transmitting significantly less light. In the case previously described for the addition of a +250 bifocal segment, for example, the portion of the mask covering the thickest upper edge of the segment would transmit 100% of incident UV light, that covering the rest of the segment would be gradually decreased over a spectrum until the thinnest portion of segment received only 55% of the incident light, and that covering the rest of the surface of the preformed lens would transmit 50%.

Another means for achieving more even curing of the segment and thin layer employs a shutter or aperture in association with the UV light source which is opened and closed such that thicker areas of the recast surface are exposed to more light than thinner surfaces. This can be accomplished by either exposing the entire surface to light and then gradually closing the aperture to expose only the thicker portions of the surface, or by exposing only the thicker portions of the surface and then gradually opening the aperture to expose more of the surface until the entire surface is exposed.

Figure 4:
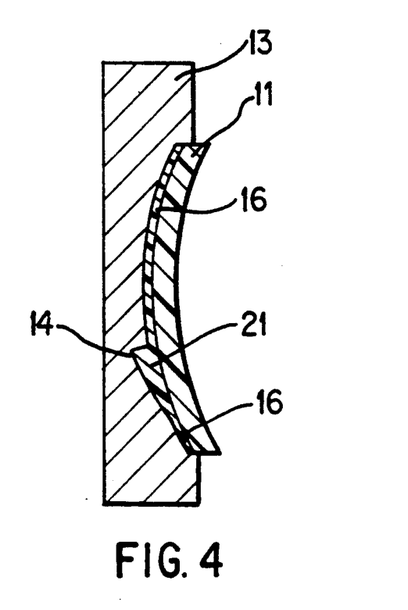
Figure 11:
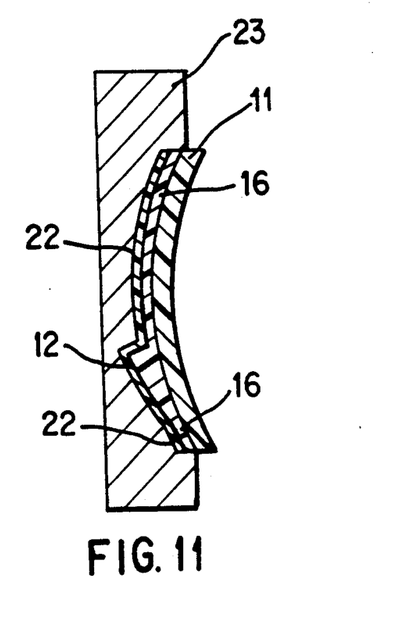
FIG. 11 is a cross-section of an assembly for recasting the surface of a lens in accordance with certain methods of the present invention.

The transition can also be avoided, reduced or removed by modifying the casting procedure in several ways, among others. First, casting carrier layers thicker than 0.8 mm decreases the likelihood of the distortion occurring. Second, the optical segment can be cast in multiple layers of lesser thickness. For example, as shown in FIGS. 4 and 5, the preformed lens 11 can be cast with a carrier 16 and a segment 21 of one-half the final desired power. This lens is then cast again, as shown in FIG. 5, with an additional carrier layer 22 with a mold 23 corresponding to the full desired thickness of the final segment 12, resulting in a finished lens having the desired optical segment. Third, the desired segment can be cast, cured and then recast with an additional layer using a mold of the same shape, for example as shown in FIG. 11. Such layer can be a thin film (e.g., 0.025-0.05 mm) or can be a thicker layer if spacers are used. Recasting fills in any transitions, distortions or defects which may have arisen during the first casting. Since the recast layer is a very thin film of resin material, it is not as susceptible to transition or other aberration. Approximately 90% of lenses having the distortion were found to be corrected by recasting the surface of the lens with a layer at least approximately 0.2 mm thick. Recasting may also be repeated again and again until the desired quality of surface is achieved seeing as almost no resulting thickness is added to the lens with each recasting. The resulting surface is then free of this type of transition. Fourth, the transition can also be avoided or diminished by forming an optical segment with a thinner edge than a flat top segment. For example, a curved top or round segment can be used. Fifth, reducing incident UV radiation while extending UV curing time can also reduce this effect. Sixth, the transition can be avoided or diminished by providing a mold which accommodates for the transition by providing excess resin material which will shrink unevenly to reach the desired transition shape. Finally, the distortion can be reduced by employing a resin material which has a low shrink rate.

The recasting method can also be used to correct other defects in rejected or damaged cast lenses. A defective lens can be recast with a thin non-prescription film layer using a mold of the same shape to remove the defects, thus decreasing yield losses during the manufacturing process. Recastings according to this method can be cured in any appropriate manner in far less time than the initial casting due to the thin film layer to be cured. Furthermore, significant savings can be accomplished due to use of less resin material and, in most cases, elimination of the need for a conventional optical gasket.

Figure 8:
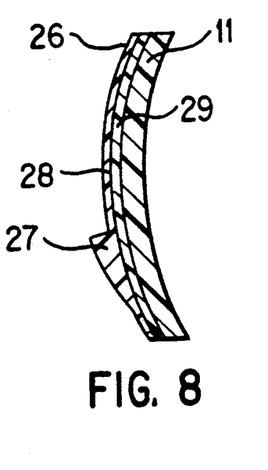
FIG. 8 is a side elevation of an assembly of a preformed lens and a preformed wafer in accordance with the present invention.

A preformed lens can also be combined according to the present invention with a second preform providing a multifocal or progressive region. As shown in FIG. 8, second preform 26 provides a multifocal region 27. Second preform 26 and preformed lens 11 are contacted to form a cavity 28 corresponding to a thin carrier layer 29 of resin material. Curing of the resin bonds second preform 26 to preformed lens 11. Preferably, the second preform, preformed lens and resin material are of the same material, although different materials may be used. A conventional optical gasket or mold may optionally be used to help hold the second preform and preformed lens in proper orientation and to provide the desired thickness to the carrier layer.

Separation of molds from the resultant lens can be facilitated by putting the assembled apparatus on ice or in some other cold source (e.g., a compressed cooling gas, such as "FREON"). The exposure to cold causes the resultant lens and molds to contract and pull away from each other such that the components can be more easily separated. Although more traditional separation methods using a water bath can be used, the separation with a cold source eliminates the need to remove water from the resultant lens and molds before further operations can be performed.

While employing the methods of the present invention in casting lenses, the resultant lenses can be marked with various "unseen" markings by employing molds which have minor imperfections corresponding to these markings when curing with UV light. When a mold contains an imperfection, the imperfection refracts the UV light such that exposure of the resin to the light source becomes uneven. The uneven curing causes a harmless distortion in the resultant lens which correspond to the imperfection in the lens, thus creating the marking. In many instances these markings will be invisible to the naked eye and can only be seen by using a polariscope. For example, a mold could be embossed with numbers corresponding to the prescription cast thereby such that the resulting lens is marked with the prescription when viewed under a polariscope. These markings could also be employed to mark features of the lens including without limitation the astigmatic axis, optical center, base curve, right, left, progressive region, optical segment and mold number.

Certain embodiments of the present invention are demonstrated by the following examples which are intended as illustrations and not as limiting the invention in any way.

EXAMPLE 1

A mold was fashioned to define the contours of an optical segment which was to provide a bifocal. The mold was made from Crown glass, electroformed nickel, or other material having the ability to cast an optical quality surface.

An optical resin material was then prepared consisting of MasterCast 1 or 2 (which contain a thermal initiator) and an added UV initiator (2-hydroxy-2-methylphenyl-propan-1-one, 6.5% by volume). The resin mixture was then dispensed into the mold. The front surface of a preformed lens (made from MasterCast 1 or 2) was masked with tape to cover all of such front surface except for the area where optical segment 12 was to be attached. The mask prevented resin from depositing on the lens surface in undesired locations and acts to block or channel UV radiation only to the area to be cured. The mold and the masked preformed lens were then contacted to form a cavity corresponding to the configuration of the optical segment. The preformed lens was placed on top of the mold filled with resin material and slight pressure was applied to squeeze out excess resin material. The weight of the preformed lens and capillary action of the resin material were sufficient to hold the assembly together without use of a conventional optical gasket.

The resin material was then cured using UV light (300-450 nm) until the resin hardened sufficiently (approximately 10-20 minutes) using a UV light source manufactured by Phillips Corporation and identified as a TL/10R/UVA reflector lamp. The mold and preformed lens were then separated. The finished lens was then edged, finished and mounted.

EXAMPLE 2

A lens was made as described in Example 1 with the exception that the resin material was cured using a combination of heat and UV radiation. The preformed lens/mold assembly containing the monomer resin material was placed in a water bath at approximately 180° F. until the resin material gelled (approximately 10-15 minutes) The assembly was then exposed to UV as described in Example 1 for 10-20 minutes to complete curing. The resulting lens was then edged, finished and mounted.

EXAMPLE 3

A lens was made and cured as described in Example 1, with the exception that the resin material comprised MasterCast 1 or 2 (without a thermal initiator) and the same UV initiator, and the preformed lens was not masked.

EXAMPLE 4

A lens was made to provide a multifocal optical surface and to induce appropriate prismatic effects. The lens was made and cured, as described in Example 3, with the exception that the conventional optical gasket used to hold the preformed lens and mold together was fashioned to separate edges of the preformed lens and mold to provide the necessary additional thickness in the resulting lens to provide the desired prismatic effect. Alternatively, a wedge of appropriate thickness was placed between the edge of the preformed lens and the mold to provide the required separation.

EXAMPLE 5

A lens was made as described in Example 3. The assembled mold and lens were then placed in a plastic or rubber conventional optical gasket which surrounded the periphery of the assembly and held the assembly together. The conventional optical gasket was fashioned such that the lens and mold were separated by a thin space which allowed the formation of a thin layer of resin over the entire surface of the preformed lens. The lens correction at the optic center of the resulting lens was the same as that of the preformed lens.

EXAMPLE 6

A lens was made as described in Example 3. Three squares of transparent tape (approximately 1-2 mm wide) were evenly spaced around the outer edge of the front surface of the preformed lens. The squares acted as spacers to produce, upon casting, a thin nonprescription carrier layer (approximately 0.2 mm thick) over the surface of the preformed lens.

EXAMPLE 7

A lens was cast by physically relocating the optical center of the preformed lens to be properly aligned with the optical segment of the finished lens. A mold defining an optical segment was filled with a portion of resin composition. A preformed lens was provided which had a diameter significantly larger than the diameter of the mold. To cast the finished lens, the optical center of the preformed lens was marked and was then positioned ("relocated") in proper alignment with the portion of the mold corresponding to the optical segment. When aligned, due to its larger diameter, the preformed lens still covered the entire mold, while a portion of the preformed lens extended beyond the mold. The preformed lens was then lightly pressed against the mold and excess resin was severed out of the resultant cavity. No conventional optical gasket was used and the preformed lens/mold assembly was held together by capillary action of the resin material. After curing, the cast lens was separated from the mold. That portion of the preformed lens which extended beyond the mold (and was not cast with new resin) was then cut away to leave the useful prescription lens surface for further finishing.

EXAMPLE 8

A lens was made as described in Example 3 to provide a flat top 28 +250 optical segment. The resultant finished lens was observed to contain a minor beneficial distortion as previously described. This "distorted" lens was then used as a preformed lens and was cast again using the same mold according to the same method. The resulting lens was observed to be virtually free of the previously observed distortion.

EXAMPLE 9

A lens was made as described in Example 3, except that the preformed lens was made from a high index plastic (HiRi), a material different from the carrier layer and optical segment casting resin material (MasterCast 1 or 2 which contains CR-39), is softer and has a different index of refraction. The cast layer bonded to the surface of the preformed lens and provided an optical quality product.

The above has been a detailed discussion of certain embodiments of the present invention. They should not be considered so as to limit the scope of applicant's invention which is defined by the appended claims.

What is claimed is:

1. A method for making a finished lens having a multifocal or progressive region, said method comprising:
   providing a mold;
   providing an optical quality resin composition;
   providing a preformed plastic lens having a predetermined lens correction at its optical center, said lens having a molding surface;
   contacting said preformed lens with said mold such that the molding surface of said preformed lens and said mold form a cavity enclosing said resin composition, wherein said resin composition is compressed in said cavity solely by the weight of said preformed lens; and
   curing said resin composition, wherein said resin is cured using ultraviolet radiation;
   wherein said cavity is shaped to correspond to the shape of said multifocal or progressive region and is shaped such that the lens correction at the optical center of said resulting lens is the same as said predetermined lens correction at the optical center of said preformed lens.

2. The method of claim 1 wherein said preformed lens is a semi-finished blank.

3. The method of claim 1 wherein said preformed lens is pre-edged.

4. The method of claim 3 wherein said mold is pre-edged.

5. The method of claim 1 wherein said resin composition is photosensitive or pre-tinted.

6. The method of claim 1 wherein said mold is coated with a coating material which is transferred to the surface of said finished lens.

7. The method of claim 6 wherein said coating material is selected from the group consisting of an antiscratch coating material, an antireflective coating material and a hard coat material.

8. The method of claim 1 wherein said preformed lens is pre-tinted.

9. The method of claim 1 wherein said finished lens is tinted by treatment with a tinting solution.

10. The method of claim 9 wherein said finished lens is at least partially masked before treatment with said tinting solution.

11. The method of claim 1 wherein said ultraviolet radiation is provided by a blinking source.

12. The method of claim 1 wherein said mold and said finished lens are separated by contacting them with a cold source.

13. The method of claim 1 wherein said mold bears an imperfection which produces a marking on said finished lens.

14. The method of claim 13 wherein said marking denotes a characteristic of said finished lens selected from the group consisting of astigmatic axis, optical center, base curve, right, left, progressive region, optical segment and mold number.

15. The method of claim 14 wherein said marking denotes the optical center of said finished lens.

16. A method according to claim 1 for making a lens comprising providing a mold having a surface which will reflect light radiation.

* * * * *

UNITED STATES PATENT AND TRADEMARK OFFICE
CERTIFICATE OF CORRECTION

PATENT NO. : 5,178,800  
DATED : Jan. 12, 1993  
INVENTOR(S) : Ronald D. Blum

Page 1 of 2

It is certified that error appears in the above-indentified patent and that said Letters Patent is hereby corrected as shown below:

IN THE ABSTRACT, line 1: Change "method and simple" to --and simple method--.

| Column | Line | |
|---|---|---|
| 1  | 27 | Change "No." to --Nos.--. |
| 2  | 30 | Change "need be" to --need to be--. |
| 2  | 67 | Change "method and much simpler" to --and much simpler method--. |
| 6  | 48 | Change "force the" to --force of the--. |
| 9  | 19 | Before "new" insert --a--. |
| 10 | 4  | Change "transferee" to --transferred--. |
| 10 | 9  | Change "transferee" to --transferred--. |
| 10 | 64 | Before "commercially-available" delete "(". |
| 12 | 37 | Change "comprises" to --comprise--. |

UNITED STATES PATENT AND TRADEMARK OFFICE
CERTIFICATE OF CORRECTION

PATENT NO. : 5,178,800
DATED : Jan. 12, 1993
INVENTOR(S) : Ronald D. Blum

It is certified that error appears in the above-indentified patent and that said Letters Patent is hereby corrected as shown below:

| Column | Line | |
|---|---|---|
| 12 | 50 | Change "makes" to --make--. |
| 14 | 20 | Change "applicants" to --applicant--. |
| 15 | 15 | Change "seeing as" to --since--. |
| 17 | 38 | Before "tape" insert --adhesive--. |
| 18 | 6 | After "previously" do not make new paragraph. |
| 18 | 64 | Change "coat" to --coating--. |

Signed and Sealed this

Fifth Day of July, 1994

Attest:

BRUCE LEHMAN

Attesting Officer​   Commissioner of Patents and Trademarks